United States Patent Office 3,391,750
Patented July 9, 1968

3,391,750
SURFACTANT COMPOSITION
Harry T. Zika, South Charleston, W. Va., assignor to Union Carbide Corporation, a corporation of New York
No Drawing. Filed Aug. 9, 1965, Ser. No. 478,482
16 Claims. (Cl. 175—71)

ABSTRACT OF THE DISCLOSURE

A surfactant composition comprising (1) from 1 to 4 parts by weight of an alkali metal or ammonium ethoxysulfate of a primary octanol, and (2) 1 part by weight of an alkali metal ammonium ethoxysulfate of a secondary n-alkanol of from 11 to 15 carbons may be used as a foamer to assist in the removal of water from wells under air or gas pressure.

---

This invention relates to a novel surfactant composition. More particularly, this invention is concerned with a synergistic combination of anionic surfactants. In a still more particular aspect, this invention is concerned with an anionic surfactant composition having particular utility as a foamer for air or gas drilling of wells.

The use of air and gas drilling techniques for drilling wells, such as oil or gas wells, recently has become a preferred technique in many parts of the country because of the higher permissible drilling speeds and resultant economic advantages over other techniques. An essential feature of the air or gas drilling technique is the use of a surfactant to remove water encountered down-hole as the drilling operation proceeds through water-bearing strata. Unless the water is removed, drill cuttings agglomerate, fouling the drill bit and causing seizure of the bit. Surfactants are employed to convert the water to a light foam column, which is readily removed by the air or gas stream and which permits the drill cuttings to be blown out of the hole. The use of surfactants in this manner is more fully described in U.S. Patent 3,130,798.

Water removal is complicated by a number of factors, with perhaps the most difficult problem being that of water salinity. To date, many of the surfactants marketed as foaming agents for air or gas drilling performs satisfactorily in water having a low saline content, generally less than about 5 to 10 weight percent dissolved salts, primarily sodium chloride. However, when waters of high salinity are encountered, these surfactants, apparently due to poor solubility in highly saline aqueous media, fail to provide satisfactory foaming. Conversely, although surfactants have been developed which are satisfactory in a high saline environment, they frequently exhibit poor performance in low saline media. Finally, although some surfactants have been developed and marketed as "all-purpose" foamers, they have been of the more expensive cationic type, such as higher-alkyltrimethylammonium chlorides, and, thus, are generally uneconomical for use in the quantities normally required by air or gas drilling techniques. The only alternative, however, is to maintain a large inventory of various low-saline and high-saline foamers, and to periodically experiment as waters of differing salinity are encountered; itself an uneconomical practice.

It has been discovered by this invention that a combination of less expensive anionic sulfate salts of poly (oxyethylene) alcohols is a superior all-purpose foamer, and surpasses the performance of many of the commercially-available products having utility under only low saline or high saline conditions, as well as the advertised all-purpose foamers.

The foaming composition of this invention comprises an admixture of (1) a sulfate salt of an ethylene oxide adduct of a primary octanol, hereinafter referred to as an octanol ethoxysulfate, and (2) a sulfate salt of an ethylene oxide adduct of a secondary n-alkanol, containing from about 11 to about 15 carbons, hereinafter referred to as a sec-n-alkanol ethoxysulfate.

The first component of the composition of this invention is an octanol ethoxysulfate of the formula:

(I)     $C_7H_{15}CH_2(OCH_2CH_2)_mSO_4M$ wherein $m$ is a number having a value, including fractional values, of from about 1 to about 4, with values of from about 2 to about 3.5 being preferred and a value of about 3 being especially preferred; and M is a monovalent cation having an atomic or molecular weight of up to about 150, including alkali metals such as sodium, potassium and lithium, the ammonium ion or substituted ammonium ions, particularly alkylammonium and hydroxyethylammonium ions. The primary octyl group can be either straight or branched chain, with n-octyl and 2-ethylhexyl being preferred.

The second component is a secondary n-alkanol ethoxysulfate of the formula:

(II)     $R(OCH_2CH_2)_nSO_4M$ wherein M is as defined above; $n$ is a number having a value, including fractional values, of from about 2 to about 6, with values of from about 3 to about 5 being preferred and a value of about 3 being especially preferred; and R is a secondary n-alkyl group of from about 11 to about 15 carbons, and preferably is a mixture of at least three alkyl groups of different chain lengths, and especially all five chain lengths, with the average chain length being in the range of from about 12 to about 15, preferably from about 12.5 to about 13.5.

As is apparent, the components of the composition of this invention are not pure compounds, but are mixtures resulting from the ethoxylation of (I) a primary octanol or (II) a secondary n-alkanol or preferably a mixture of at least three different secondary n-alkanols. Thus, the values of $m$ and $n$ represent averages, and do not necessarily signify pure compounds.

The ratio of octanol ethoxysulfate to secondary n-alkanol ethoxysulfate is not highly critical to this invention, but generally is in the range of from about 1 to about 4 parts by weight of octanol ethoxysulfate per part of sec-n-alkanol ethoxysulfate. A weight ratio of about 2:1 is preferred.

The compositions of this invention are readily produced by known techniques, such as by the reaction of a primary octanol and/or a secondary-n-alkanol with ethylene oxide followed by sulfation of the resulting ethoxylate and neutralization of the alkyl sulfuric acid with a base such as an ammonium or alkali metal hydroxide. Due to the differences in reaction rates of primary and secondary hydroxyl groups with ethylene oxide, it is preferred that at least the ethoxylates be prepared separately to provide the desired ethyleneoxy (—$CH_2CH_2O$—) content for each component. The ethoxylates can then be blended, sulfated and neutralized, or these steps can be conducted separately and the alcohol ethoxysulfates blended.

In normal use the surfactant composition is supplied to the driller in aqueous solution. The concentration of the surfactant composition in the aqueous solution is not highly critical, but normally ranges from about 50 to about 75 weight percent. At lower concentrations there is a danger of freezing the composition under atmospheric conditions extant at the well-head, as well as the economic disadvantage of transporting a high water content product. At higher concentrations than about 75 percent, the surfactant may not remain in solution or may form a highly viscous mixture or even a slurry. If desired, the aqueous solution may contain other additives, such as foam boosters and the like, although they are ordinarily unnecessary. In use, the solution is diluted with water at the well-head to provide a solution having the desired viscosity and then pumped into the well by known techniques, such as the process of U.S. Patent 3,130,798.

The compositions are not limited in their utility to air or gas drilling alone, and are also useful in the unloading of existing wells; i.e., to aid in the removal of water which has seeped into the bore hole, by the use of compressed air or gas.

The following examples are illustrative. In the examples, the various surfactants or mixtures thereof were tested by the following procedures:

(1) Foam volume (a measure of total foaming ability). The sample to be evaluated (0.5 milliliter if liquid and 0.5 gram if solid) was dissolved in 99.5 milliliters of distilled or salt water. In most instances, 1 milliliter of Gulf Security Oil, without additives, was added to simulate seepage of oil into gas wells, a factor normally adversely affecting foaming. The resulting formulation was charged to a graduated glass mixing jar, and then vigorously stirred for 30 seconds. The initial foam volume, in milliliters, was determined immediately by reading the top of the main body of the foam, including the lower liquid layer, if any, but disregarding large bubbles which may appear above the compact foam.

(2) Half-life (a measure of foam stability).—The half-life is the time in minutes required for one-half of the formulation, i.e., 50 milliliters of liquid, to layer out of the foam. In cases in which a small amount of foam is generated, the line of demarcation between liquid and foam appears within 2 or 3 seconds after subsidence of the turbulence, and the liquid volume is well over the 50-milliliter calibration mark. In such instances, the half-life is reported as nil.

EXAMPLE 1

A series of experiments was conducted to evaluate an ammonium 2-ethylhexanol ethoxysulfate (Compound A) having an average of 3 ethyleneoxy (—$CH_2CH_2O$—) units and an ammonium secondary-in-alkanol ethoxysulfate (Compound B) having as an alkyl group a random mixture of $C_{11}$ to $C_{15}$ secondary n-alkyl groups averaging about 13 carbons, and containing an average of 3 ethyleneoxy units, separately and in admixture (2 parts by weight of A and 1 part by weight of B) as foamers in distilled water or salt water (10 percent sodium chloride), with and without an added 1 percent oil. The results of these experiments are summarized in Table I.

TABLE I

| Aqueous Medium | Surfactant | Foam Volume | Half-life |
|---|---|---|---|
| Distilled Water | A | 475 | 1.70 |
|  | B | 710 | 4.63 |
|  | 2A:1B | 705 | 4.03 |
| Distilled Water and Oil | A | 450 | 1.62 |
|  | B | 695 | 4.52 |
|  | 2A:1B | 730 | 4.07 |
| Salt Water | A | 625 | 4.20 |
|  | B | 220 | 0.22 |
|  | 2A:1B | 520 | 3.48 |
| Salt Water and Oil | A | 550 | 4.77 |
|  | B | 210 | 0.25 |
|  | 2A:1B | 520 | 3.38 |

As is seen the 2-ethylhexanol ethoxysulfate is a poor foamer in fresh water, but is excellent in highly saline media. The $C_{11}$-$C_{15}$ sec-n-alkanol ethoxysulfate, on the other hand, is a good foamer in distilled water, but is poor in highly saline media. Their mixture, however, provides a high initial foam level and good foam stability, generally approaching and, in one case, even surpassing the performance of the better of the individual components when tested individually in the same medium. Thus, it is clear that the composition of this invention is a highly effective all-purpose foamer, which effectiveness results from a synergistic effect of the combination. Note also that the presence of oil had little or no effect on the performance of the blend, although it did reduce the effectiveness of the individual components.

EXAMPLE 2

For purposes of comparison, a series of experiments was conducted in distilled water or salt water media, each containing oil, to evaluate representative products which are presently commercially available. These results are summarized in Table II, with the data for the composition of this invention being included to simplify comparison.

TABLE II

| Surfactant | Distilled Water | | Salt Water | |
|---|---|---|---|---|
|  | Foam Volume | Half-Life | Foam Volume | Half-Life |
| Nonionic: "Afrox 200" | 280 | 1.52 | 340 | 2.55 |
| Cationic: |  |  |  |  |
| "La Cal LC-400" | 450 | 2.22 | 225 | 0.72 |
| "Magcofoam 33" | 240 | 0.42 | 200 | Nil |
| "Westco Foaming Additive" | 380 | 2.88 | 420 | 3.50 |
| Anionic: |  |  |  |  |
| "Adafoam 50" | 535 | 2.45 | 345 | 1.48 |
| "O.K. Liquid" | 460 | 2.65 | 210 | 0.63 |
| "Synfoam No. 2" | 575 | 3.10 | 195 | Nil |
| This invention | 730 | 4.07 | 520 | 3.38 |

"Adafoam 50"—An admixture of an anionic (sulfate) surfactant and an amide foam booster manufactured by Continental Oil Co., and marketed as an all-purpose foamer.

"Afrox 200"—A nonionic alkanol-ethylene oxide adduct manufactured by the Baroid Division of National Lead Co., and marketed primarily as a high saline foamer.

"La Cal LC-400"—A cationic surfactant manufactured by La Cal Mud Co., and marketed as an all-purpose foamer.

"O.K. Liquid"—An admixture of a modified ammonium alkyl sulfate (anionic) surfactant and an organic builder manufactured by Procter & Gamble Corp. and marketed primarily as a low saline foamer.

"Synfoam No. 2"—An anionic surfactant manufactured by Swift & Co. and marketed primarily as a saline foamer.

"Westco Foaming Additive"—A cationic surfactant manufactured by Westco, Inc., and marketed as an all-purpose foamer.

In general, a good foamer should provide a foam volume of at least about 400 cubic centimeters with a half-life of at least about 3 minutes in distilled water and a foam volume of at least about 300 cubic centimeters with a half-life of at least about 2 minutes in 10 percent salt water. To emphasize the superiority of the composition of this invention over the commercially-available foamers, the data of Table II is retabulated in Table III as ratios of the observed data to these base criteria.

TABLE III

| Surfactant | Distilled Water | | Salt Water | |
|---|---|---|---|---|
|  | Foam Volume | Half-Life | Foam Volume | Half-Life |
| Nonionic: "Afrox 200" | 0.70 | 0.51 | 1.13 | 1.28 |
| Cationic: |  |  |  |  |
| "La Cal LC-400" | 1.13 | 0.74 | 0.75 | 0.36 |
| "Magcofoam 33" | 0.60 | 0.14 | 0.67 | 0 |
| "Westco Foaming Additive" | 0.95 | 0.96 | 1.40 | 1.75 |
| Anionic: |  |  |  |  |
| "Adafoam 50" | 1.34 | 0.81 | 1.15 | 0.74 |
| "O.K. Liquid" | 1.15 | 0.88 | 0.70 | 0.32 |
| "Synfoam No. 2" | 1.44 | 1.03 | 0.65 | 0 |
| This invention | 1.83 | 1.36 | 1.73 | 1.69 |

As is readily seen, few of the commercially-available foamers for air or gas drilling have good activity in both low- and high-saline media, and none of them have the superior over-all foaming ability and foam stability possessed by the composition of this invention.

EXAMPLE 3

The data summarized in Table IV illustrate the wide range in component proportions which can be employed in accordance with this invention and still obtain desirable results in oil-containing saline or non-saline media, although a ratio of about 2 parts by weight octanol ethoxysulfate per part $C_{11}$–$C_{15}$ sec-n-alkanol ethoxysulfate is considered optimum for use in both low- and high-saline environments.

TABLE IV

| Surfactant Alkyl | | Distilled Water | | Salt Water | |
|---|---|---|---|---|---|
| 2-ethyl hexyl | $C_{11}$–$C_{15}$ sec-n-alkyl | Foam Volume | Half-Life | Foam Volume | Half-Life |
| 1 | 1 | 775 | 4.40 | 480 | 2.60 |
| 2 | 1 | 730 | 4.07 | 520 | 3.38 |
| 4 | 1 | 685 | 3.37 | 540 | 4.12 |

EXAMPLE 4

Employing a 2:1 weight ratio of 2-ethylhexanol ethoxysulfate to ammonium $C_{11}$–$C_{15}$ sec-n-alkanol ethoxysulfate in distilled or salt water containing oil, a series of experiments was run to determine the effect of different cations of the octanol ethoxysulfate. The data for these experiments are summarized in Table V.

TABLE V

| Cation | Distilled Water | | Salt Water | |
|---|---|---|---|---|
| | Foam Volume | Half-Life | Foam Volume | Half-Life |
| Na⁺ | 630 | 4.27 | 525 | 3.48 |
| NH₄⁺ | 730 | 4.07 | 520 | 3.38 |

A similar lack of substantial effect is obtained when other cations, such as potassium, alkylammonium, or ethanolammonium, are employed either for the octanol ethoxysulfate and/or the sec-n-alkanol ethoxysulfate.

EXAMPLE 5

Employing a 1:1 weight ratio of ammonium 2-ethylhexanol sulfate or ethoxysulfate to ammonium $C_{11}$–$C_{15}$ sec-n-alkanol ethoxysulfate, a series of experiments was conducted in oil-containing distilled or salt water to determine the optimum ethyleneoxy content of the ethylhexanol ethoxysulfate. The results of these experiments are summarized in tabular form as follows:

TABLE VI

| Ethyleneoxy units in Ethylhexanol ethoxysulfate | Distilled Water | | Salt Water | |
|---|---|---|---|---|
| | Foam Volume | Half-Life | Foam Volume | Half-Life |
| 0 | 625 | 4.57 | 360 | 0.68 |
| 1.8 | 740 | 4.63 | 470 | 1.68 |
| 3.0 | 775 | 4.40 | 480 | 2.60 |
| 3.3 | 780 | 4.53 | 480 | 2.43 |
| 4.0 | 635 | 4.08 | 455 | 1.85 |

Based upon these data, the optimum ethyleneoxy content of ammonium 2-ethylhexanol ethoxysulfate is in the range of 3.0 to 3.3, although an effective all-purpose foamer is obtained in the range of from about 1.8 to about 4.0.

EXAMPLE 6

Employing 1:1 ratios of ammonium 2-ethylhexanol ethoxysulfate to ammonium $C_{11}$–$C_{15}$ sec-n-alkanol sulfate or ethoxysulfate in distilled or salt water containing oil, a series of experiments was conducted to determine the optimum ethyleneoxy content of the sec-n-alkanol ethoxysulfate. The results are summarized in Table VII.

TABLE VII

| Ethyleneoxy Units | Distilled Water | | Salt Water | |
|---|---|---|---|---|
| | Foam Volume | Half-Life | Foam Volume | Half-Life |
| 0 | 760 | 4.45 | 280 | 0.22 |
| 3 | 700 | 4.72 | 490 | 2.40 |
| 4.6 | 695 | 4.35 | 495 | 2.88 |

From these data, the optimum ethyleneoxy of the $C_{11}$–$C_{15}$ sec-n-alkanol ethoxylate content is in the range of from about 3 to about 4.6.

EXAMPLE 7

The carbon-number spread of the secondary n-alkyl group of the secondary n-alkanol ethoxysulfate is not narrowly critical, but improved performance is observed when a wider spread is employed, as is evidenced by the data summarized in Table VIII for tests in distilled and salt water containing oil with compositions containing a 1:1 ratio of ammonium 2-ethylhexanol ethoxysulfate to ammonium secondary-n-alkanol ethoxysulfate.

TABLE VIII

| Sec-n-alkyl range | Distilled Water | | Salt Water | |
|---|---|---|---|---|
| | Foam Volume | Half-Life | Foam Volume | Half-Life |
| $C_{11}$–$C_{13}$ | 665 | 4.42 | 470 | 2.08 |
| $C_{13}$–$C_{15}$ | 655 | 4.05 | 365 | 0.68 |
| $C_{11}$–$C_{15}$ | 700 | 4.72 | 490 | 2.40 |

The main effect of the change in chain length or carbon number spread is in the foaming properties in highly saline media with performance falling off as the average chain length increases and the carbon number range decreases.

EXAMPLE 8

This example illustrates the lack of effect of the degree of branching of the octyl group of the octyl ethoxysulfate in tests employing a 2:1 ratio of ammonium octyl ethoxy sulfate to ammonium $C_{11}$–$C_{15}$ sec-alkyl ethoxysulfate in distilled water or salt water containing oil.

TABLE IX

| Octyl group | Distilled Water | | Salt Water | |
|---|---|---|---|---|
| | Foam Volume | Half-Life | Foam Volume | Half-Life |
| n-Octyl | 680 | 4.00 | 505 | 3.47 |
| 2-ethylhexyl | 700 | 3.88 | 535 | 3.48 |

Octyl groups having little or no branching are preferred, however, due to their better biodegradability over more highly branched radicals.

What is claimed is:

1. A surfactant composition consisting essentially of a primary octanol ethoxysulfate represented by the formula

$$C_7H_{15}CH_2(OCH_2CH_2)_mSO_4M$$

and a secondary n-alkanol ethoxysulfate represented by the formula

$$R(OCH_2CH_2)_nSO_4M$$

wherein $m$ is a number having a value of from about 1 to about 4, $n$ is a number having value of from about 2 to 6, M is a monovalent cation selected from the group consisting of alkali metal, ammonium, hydroxyethylammonium and alkylammonium cations having molecular weights of up to 150 and R is a secondary n-alkyl group of from about 11 to about 15 carbons, and the weight ratio of said octanol ethoxysulfate to said secondary n-alkanol sulfate is in the range of from about 1:1 to about 4:1.

2. The composition as claimed in claim 1 wherein $m$ has a value of from about 2 to about 3.5, $n$ has a value of from about 3 to about 5, M is the ammonium cation and and R represents a mixture of at least three different alkyl radicals in the range of from about 11 to about 15 carbons.

3. The composition as claimed in claim 2 wherein said octyl ethoxysulfate is an n-octyl ethoxysulfate and said secondary n-alkanol ethoxysulfate has an alkyl group containing carbon numbers in the range of 11 to 15 and has an average chain length of from about 12 to about 15 carbons.

4. The composition as claimed in claim 2 wherein said octyl ethoxysulfate is 2-ethylhexyl ethoxysulfate and said secondary n-alkanol ethoxysulfate has an alkyl group containing carbon numbers in the range of 11 to 15 and an average chain length of from about 12 to about 15 carbons.

5. An aqueous surfactant composition suitable for use as a foamer for air or gas drilling consisting essentially of an aqueous medium containing from about 50 to about 75 weight percent of a mixture of a primary octanol ethoxysulfate represented by the formula $$C_7H_{15}CH_2(OCH_2CH_2)_mSO_4M$$

and a secondary n-alkanol ethoxysulfate represented by the formula $$R(OCH_2CH_2)_nSO_4M$$

wherein $m$ is a number having a value of from about 1 to about 4, $n$ is a number having a value of from about 2 to about 6, M is a monovalent cation selected from the group consisting of alkali metal, ammonium, hydroxyethylammonium and alkylammonium cations having molecular weights of up to 150 and R is a secondary n-alkyl group of from about 11 to about 15 carbons, and the weight ratio of said octanol ethoxysulfate to said secondary n-alkanol sulfate is in the range of from about 1:1 to about 4:1.

6. The composition as claimed in claim 5 wherein $m$ has a value of from about 2 to about 3.5, $n$ has a value of from about 3 to about 5, M is the ammonium cation and R represents a mixture of at least three different alkyl radicals in the range of from about 11 to about 15 carbons.

7. The composition as claimed in claim 6 wherein said octyl ethoxysulfate is an n-octyl ethoxysulfate and said secondary n-alkanol ethoxysulfate has an alkyl group containing carbon numbers in the range of 11 to 15 and has an average chain length of from about 12 to about 15 carbons.

8. The composition as claimed in claim 6 wherein said octyl ethoxysulfate is 2-ethylhexyl ethoxysulfate and said secondary n-alkanol ethoxysulfate has an alkyl group containing carbon numbers in the range of 11 to 15 and has an average chain length of from about 12 to about 15 carbons.

9. In the method for drilling a well by air or gas drilling techniques, and employing a surfactant to assist in the removal of water present in the bore hole, by forming an aqueous foam in said well the improvement of injecting in said well as said surfactant a composition consisting essentially of a primary octanol ethoxysulfate represented by the formula $$C_7H_{15}CH_2(OCH_2CH_2)_mSO_4M$$

and a secondary n-alkanol ethoxysulfate represented by the formula $$R(OCH_2CH_2)_nSO_4M$$

wherein $m$ is a number having a value of from about 1 to about 4, $n$ is a number having a value of from about 2 to about 6, M is a monovalent cation selected from the group consisting of alkali metal, ammonium, hydroxyethylammonium and alkylammonium cations having molecular weights of up to 150 and R is a secondary n-alkyl group of from about 11 to about 15 carbons, and the weight ratio of said octanol ethoxysulfate to said secondary n-alkanol sulfate is in the range of from about 1:1 to about 4:1.

10. The method as claimed in claim 9 wherein $m$ has a value of from about 2 to about 3.5, $n$ has a value of from about 3 to about 5, M is the ammonium cation and R represents a mixture of at least three different alkyl radicals in the range of from about 11 to about 15 carbons.

11. The method as claimed in claim 10 wherein said octyl ethoxysulfate is an n-octyl ethoxysulfate and said secondary n-alkanol ethoxysulfate has an alkyl group containing carbon numbers in the range of 11 to 15 and has an average chain length of from about 12 to about 15 carbons.

12. The method as claimed in claim 10 wherein said octyl ethoxysulfate is 2-ethylhexyl ethoxysulfate and said secondary n-alkanol ethoxysulfate has an alkyl group containing carbon numbers in the range of 11 to 15 and has an average chain length of from about 12 to about 15 carbons.

13. In the method for removing water present in a well bore comprising forcing said water out of said bore with air or gas at elevated pressure and employing a surfactant to assist in the removal of said water, by forming an aqueous foam in said well bore the improvement of injecting in said well bore as said surfactant a composition consisting essentially of a primary octanol ethoxysulfate represented by the formula $$C_7H_{15}CH_2(OCH_2CH_2)_mSO_4M$$

and a secondary n-alkanol ethoxysulfate represented by the formula $$R(OCH_2CH_2)_nSO_4M$$

wherein $m$ is a number having a value of from about 1 to about 4, $n$ is a number having a value of from about 2 to about 6, M is a monovalent cation selected from the group consisting of alkali metal, ammonium, hydroxyethylammonium and alkylammonium cations having molecular weights of up to 150 and R is a secondary n-alkyl group of from about 11 to about 15 carbons, and the weight ratio of said octanol ethoxysulfate to said secondary n-alkanol sulfate is in the range of from about 1:1 to about 4:1.

14. The method as claimed in claim 13 wherein $m$ has a value of from about 2 to about 3.5, $n$ has a value of from about 3 to about 15, M is the ammonium cation and R represents a mixture of at least three different alkyl radicals in the range of from about 11 to about 15 carbons.

15. The method as claimed in claim 14 wherein said octyl ethoxysulfate is an n-octyl ethoxysulfate and said secondary n-alkanol ethoxysulfate has an alkyl group containing carbon numbers in the range of 11 to 15 and has an average claim length of from about 12 to about 15 carbons.

16. The method as claimed in claim 14 wherein said octyl ethoxysulfate is 2-ethylhexyl ethoxysulfate and said secondary n-alkanol ethoxysulfate has an alkyl group containing carbon numbers in the range of 11 to 15 and has an average chain length of from about 12 to about 15 carbons.

References Cited
UNITED STATES PATENTS

| | | | |
|---|---|---|---|
| 1,970,578 | 8/1934 | Schoeller et al. | 260—98 |
| 2,766,212 | 10/1956 | Grifo | 252—152 |
| 3,215,200 | 11/1965 | Kirkpatrick et al. | 252—855 X |
| 3,229,777 | 1/1966 | Rogers et al. | 252—8.5 X |

LEON D. ROSDOL, *Primary Examiner.*

HERBERT B. GUYNN, *Examiner.*